US012252425B2

(12) United States Patent
Nicholson et al.

(10) Patent No.: US 12,252,425 B2
(45) Date of Patent: Mar. 18, 2025

(54) SYSTEM AND METHOD FOR TREATING EVAPORATOR BLOWDOWN

(71) Applicant: Veolia Water Technologies, Inc., Cary, NC (US)

(72) Inventors: Mark C. Nicholson, Pewaukee, WI (US); Corey Skadahl, Madison, WI (US)

(73) Assignee: Veolia Water Technologies, Inc., Cary, NC (US)

( * ) Notice: Subject to any disclaimer, the term of this patent is extended or adjusted under 35 U.S.C. 154(b) by 487 days.

(21) Appl. No.: 17/628,435

(22) PCT Filed: Jul. 22, 2020

(86) PCT No.: PCT/US2020/043000
§ 371 (c)(1),
(2) Date: Jan. 19, 2022

(87) PCT Pub. No.: WO2021/016310
PCT Pub. Date: Jan. 28, 2021

(65) Prior Publication Data
US 2022/0281764 A1  Sep. 8, 2022

Related U.S. Application Data

(60) Provisional application No. 62/877,353, filed on Jul. 23, 2019.

(51) Int. Cl.
*C02F 9/00* (2023.01)
*B04B 1/08* (2006.01)
(Continued)

(52) U.S. Cl.
CPC .................. *C02F 9/00* (2013.01); *B04B 1/08* (2013.01); *C02F 1/048* (2013.01); *C02F 1/385* (2013.01);
(Continued)

(58) Field of Classification Search
CPC ...... C02F 9/00; C02F 1/04; C02F 1/38; C02F 1/40; C02F 1/52; B01D 17/02;
(Continued)

(56) References Cited

U.S. PATENT DOCUMENTS

| 9,776,105 B2 | 10/2017 | Collins et al. | |
| 2010/0038081 A1* | 2/2010 | Gamache | E21B 43/35 |
| | | | 166/267 |
| 2016/0326015 A1* | 11/2016 | Neu | E21B 43/40 |

FOREIGN PATENT DOCUMENTS

| CA | 2726222 A1 | 12/2009 | |
| CA | 2891199 A1 | 11/2015 | |
| WO | WO-2013166458 A1 * | 11/2013 | ............ C12M 21/12 |

* cited by examiner

*Primary Examiner* — Walter D. Griffin
*Assistant Examiner* — Cameron J Allen
(74) *Attorney, Agent, or Firm* — COATS & BENNETT, PLLC

(57) ABSTRACT

The present invention entails dual centrifuges configured to remove suspended solids, silica, and other precipitants from evaporator brine prior to the brine being disposed of via deep well injection. First, the evaporator brine is directed through a highly efficient first centrifuge configured to remove essentially all suspended solids, including very small suspended solids that typically cannot be retained in a filter or other dewatering devices. The centrate from the first centrifuge, depleted in suspended solids, silica and other precipitants, can be disposed of via deep well injection. The first centrifuge also produces a slurry that is directed to a separate centrifuge that produces a second centrate and waste wet cake. The second centrate is recycled and mixed with the evaporator brine and the mixture is directed to the first centrifuge.

9 Claims, 4 Drawing Sheets

(51) Int. Cl.
  *C02F 1/04*      (2023.01)
  *C02F 1/38*      (2023.01)
  *C02F 1/52*      (2023.01)
  *C02F 101/32*    (2006.01)
  *C02F 103/10*    (2006.01)
(52) U.S. Cl.
  CPC .... *C02F 2001/5218* (2013.01); *C02F 1/5236* (2013.01); *C02F 2101/32* (2013.01); *C02F 2103/10* (2013.01); *C02F 2301/046* (2013.01); *C02F 2301/08* (2013.01)
(58) Field of Classification Search
  CPC .... B04B 1/08; F17D 3/00; B08B 3/12; A62D 3/13; G05B 21/00; H01L 21/30; G01H 3/08
  See application file for complete search history.

SYSTEM AND METHOD FOR TREATING EVAPORATOR BLOWDOWN

RELATED APPLICATIONS

This application claims priority to U.S. Application No. 62/877,353, filed 23 Jul. 2019, disclosure of which is incorporated in its entirety by reference herein.

FIELD OF THE INVENTION

The present invention relates to systems and processes for treating evaporator blowdown produced in the course of treating produced water.

BACKGROUND OF THE INVENTION

Evaporators are widely used to treat produced water. In the course of treating produced water, evaporators produce a concentrate or brine (blowdown) that requires disposal. Evaporator brines typically include "seeds" or suspended solids that are often very small, sometimes on the order of 5 microns or less. Before these evaporator brines can be disposed of, such as through deep well injection, these seeds and suspended solids must be substantially removed.

It is known to use filtration to remove the suspended solids from evaporator brines. But there are serious drawbacks to removing such small suspended solids via filtration. First, filtration times are long and this adversely impacts efficiency and capacity. Secondly, removing suspended solids from evaporator brines through filtrations requires large filters. Finally, many such filters are inefficient, resulting in the filtrate still containing a substantial amount of suspended solids.

Therefore, there is a need for a highly efficient process for removing seeds or suspended solids from evaporator brines that overcomes the shortcomings in filtration processes.

SUMMARY OF THE INVENTION

The present invention entails dual centrifuges for removing suspended solids from evaporator brine. First, the evaporator brine is directed through a highly efficient first centrifuge configured to remove suspended solids down to very small sizes on the order of 5 microns or less. One example of such a centrifuge is a disk stack centrifuge. Centrate produced by the first centrifuge is substantially depleted of suspended solids, even those that are as small as 1 micron or sub-micron particles. The centrate can be disposed of through, for example, deep well injection. Concentrate (slurry) from the first centrifuge is directed to a second centrifuge, such as a solid bowl centrifuge, that produces waste wet cake (solids) and a second centrate. The second centrate is mixed with the evaporator brine and directed to the first centrifuge.

In another embodiment, the evaporator brine includes soluble silica. That too should be removed from the evaporator brine prior to disposal. In this case, the evaporator brine is directed to a crystallizer and a magnesium source, such as magnesium chloride (as solution or made in situ using Magnesium oxide and acid), is mixed with the evaporator brine. This forms a precipitated complex of magnesium and silica. From the crystallizer, the evaporator brine with precipitated silica is directed to the first centrifuge that removes the precipitated silica along with other suspended solids and precipitants from the evaporator brine. Similar to the process described above, the centrate from the first centrifuge, substantially depleted in silica and suspended solids, can be disposed of through deep well injection or other appropriate means. The slurry from the first centrifuge is directed to the second centrifuge that produces the waste wet cake and the second centrate stream that is recycled and mixed with the evaporator brine being directed to the first centrifuge. Also, a portion of the slurry produced by the first centrifuge can be recycled as a seed slurry to the crystallizer to enhance the precipitation of silica and other dissolved solids.

Either of the two embodiments described above can be incorporated into a produced water treatment process that includes an evaporator that evaporates the produced water to produce a distillate and a concentrated evaporator brine.

Other objects and advantages of the present invention will become apparent and obvious from a study of the following description and the accompanying drawings which are merely illustrative of such invention.

DETAILED DESCRIPTION OF THE INVENTION

Figure 1:
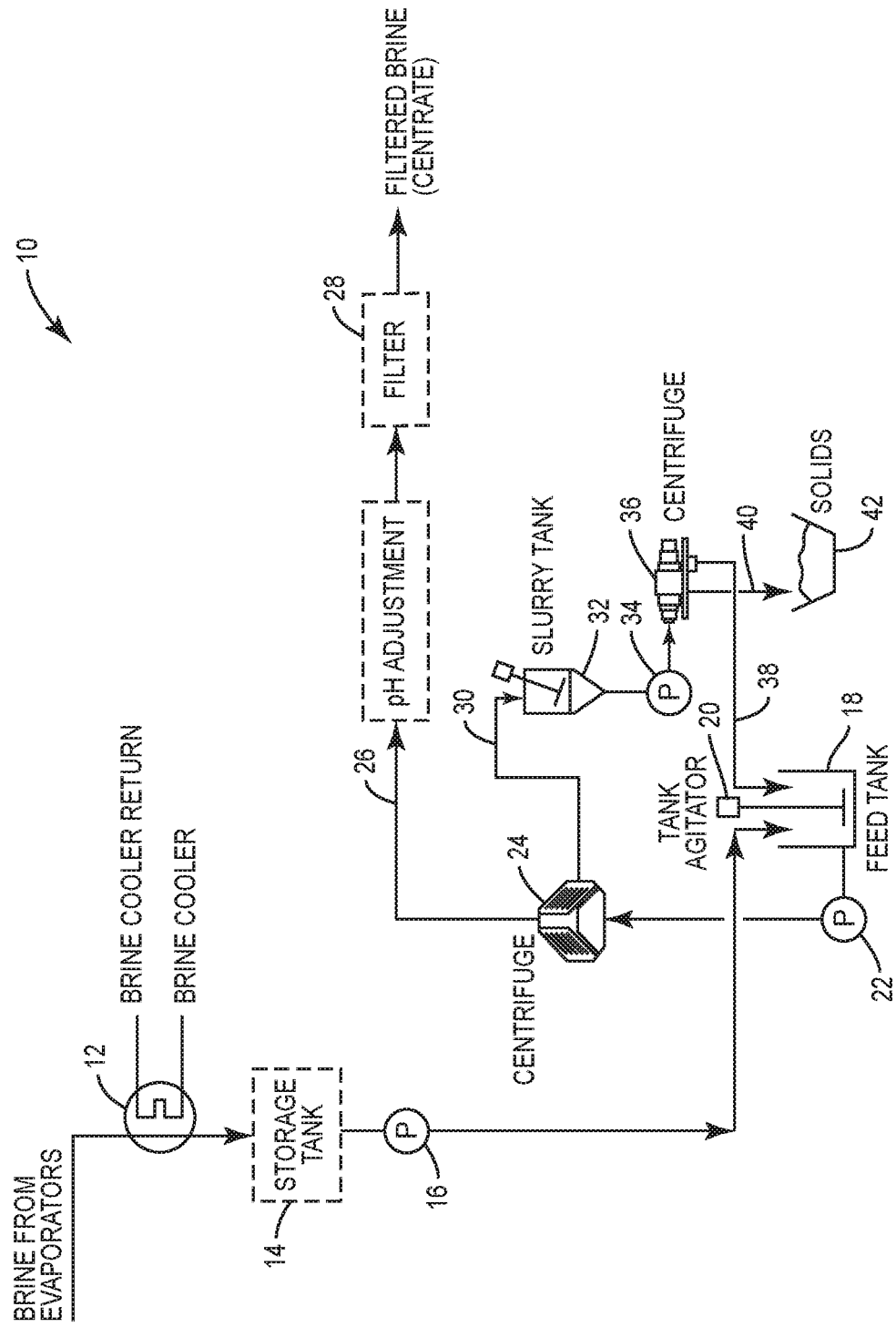
FIG. 1 is a schematic illustration of a process for removing seed material or suspended silica solids and other precipitated solids from evaporator brine.

With further reference to the drawings, particularly FIG. 1, there is shown therein a system and process, indicated generally by the numeral 10, for removing suspended solids or suspended particles from evaporator brine. As discussed above, evaporator brines produced in the course of treating produced water often contain substantial suspended solids, silica and other precipitants. The process shown in FIG. 1 is designed to remove suspended solids from the evaporator brines such that regulatory limits are met and the brines can be disposed of through deep well injection.

With reference to FIG. 1, evaporator brine is cooled by directing the brine through a heat exchanger 12. Downstream of the heat exchanger 12 is an optional brine storage tank 14 that collects and holds the evaporator brine. A pump 16 is provided and pumps the evaporator brine from the storage tank 14 to a centrifuge feed tank 18. Centrifuge feed tank 18 includes an agitator for mixing evaporator brine with the centrate from a centrifuge 36 which will be subsequently discussed.

In any event, the mixture contained in the centrifuge feed tank 18 is pumped via pump 22 to a highly efficient centrifuge for the purpose of separating seed material or suspended solids from the evaporator brine. The seed material or suspended solids in the evaporator brine can be as small as 5 microns or even less. Thus, it is advantageous to employ a centrifuge device that is effective to separate these very small suspended solids from the evaporator brine. Various types of centrifuges may be used. In a preferred embodiment, the centrifuge employed is a disk stack centrifuge that is indicated by the numeral 24 in FIG. 1. Details of the disk stack centrifuge are not dealt with herein because the structure of such is not per se material to the present invention. However, a brief explanation of the structure and operation of a disk stack centrifuge is appropriate.

Disk stack centrifuges are versatile devices used for separating solid/liquid mixtures. They can be operated in continuous, semi-continuous or batch configurations. Although the specific designs of disk stack centrifuges varies, they are generally characterized by an imperforate bowl that surrounds an inverted stack of spaced apart thin conical disks. To separate suspended solids from the evaporator brine in this case, the evaporator brine is directed into a feed inlet that in a typical design is located at the top and generally in the center of the centrifuge. As the disks are spun on a common vertical axis, the evaporator brine is fed centrally from the top and travels downwardly through the annular spaces between the disks. Due to the centrifugal forces being applied, the suspended solids tend to accumulate on the underside of the disk from where they slide down towards the outer periphery of the centrifuge bowl. In a continuous configuration, the suspended solids form a part of a slurry which exits through nozzles or outlets positioned on the outer periphery of the bowl. In the course of separating the suspended solids from the evaporator brine, the disk stack centrifuge produces a centrate that is substantially depleted in suspended solids and which can be disposed of through deep well injection or other suitable means.

The centrate produced by centrifuge 24 is directed through centrate line 26 to an optional filter 28. Filter 28 functions to remove residual suspended solids from the evaporator brine. Effluent from the filter 28 is substantially depleted in suspended solids and is appropriate for deep well injection or other appropriate approaches. In some areas, the pH of the evaporator brine being disposed is regulated. For example, some areas or some applications require that the pH of the brine be 10 or less prior to deep well injection. As an option, a pH adjustment can be performed in the centrate line 26 in order to comply or meet a regulatory or application pH limit.

Centrifuge 24 produces a slurry that contains concentrated suspended solids. A slurry line 30 extends from the centrifuge 24 to a slurry tank 32. Slurry produced by the centrifuge 24 is directed through slurry line 30 to the slurry tank 32. Slurry tank 32 includes a mixer for mixing the slurry. A pump 34 pumps the slurry from the slurry tank 32 to a second centrifuge 36 which, in a preferred embodiment, comprises a solid bowl centrifuge. Second centrifuge 36 further concentrates the slurry and produces a second centrate which is directed from the centrifuge 36 through a centrate line 38 to the centrifuge feed tank 18. There the second centrate is mixed with the evaporator brine and the mixture is directed to the first centrifuge 24. The second centrifuge 36 produces a waste wet cake that is directed through line 40 to a solids collection trough or bin 42 or another similar structure.

Often produced waters contain soluble silica and some of the silica can pass through the process and end up in the evaporator brine. This is particularly true in high pH pre-treatment processes because silica is relatively soluble at high pH and hence is not substantially precipitated out of the produced water during pre-treatment.

Figure 2:
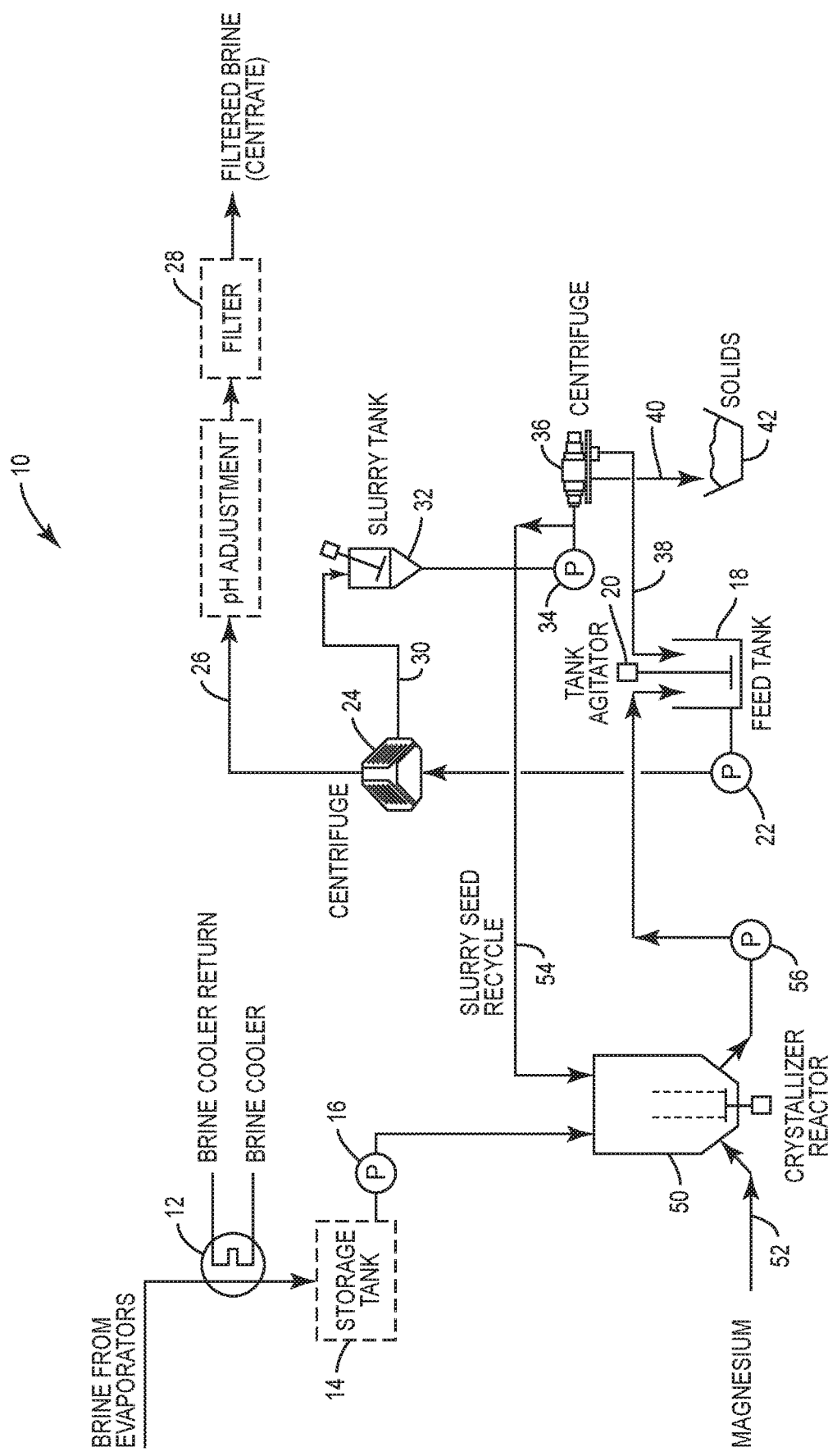
FIG. 2 is a schematic illustration of a process that treats an evaporator brine having dissolved silica, as well as suspended solids.

The process of FIG. 2 addresses evaporator brine having a significant concentration of silica. The FIG. 2 process is quite similar to the process described above and shown in FIG. 1. It differs in that a crystallizer 50 is added to the system to react dissolved silica and other components that can precipitate in disposal wells if not removed from the brine. As seen in FIG. 2, evaporator brine is directed from the storage tank 14 to the crystallizer 50. Line 52 is operative to direct a magnesium source, such as magnesium hydroxide or magnesium chloride, into the crystallizer 50. When the magnesium source is mixed with the evaporator brine in the crystallizer 50, this results in the formation of magnesium hydroxide and results in the co-precipitation of magnesium hydroxide and silica. The reacted brine in the crystallizer 50 will typically include precipitated silica, other precipitants and suspended solids. A crystallizer pump 56 is operative to pump the concentrated evaporator brine from the crystallizer 50 to the centrifuge feed tank 18, which is optimal. Thereafter, the process is much the same as described above and that depicted in FIG. 1. There is, however, one other additional feature. A portion of the slurry produced by the first centrifuge 24 can be directed through a seed recycle line 54 back to the crystallizer 50. This effectively seeds the crystallizer and enhances the precipitation of silica and other dissolved solids.

Figure 3:
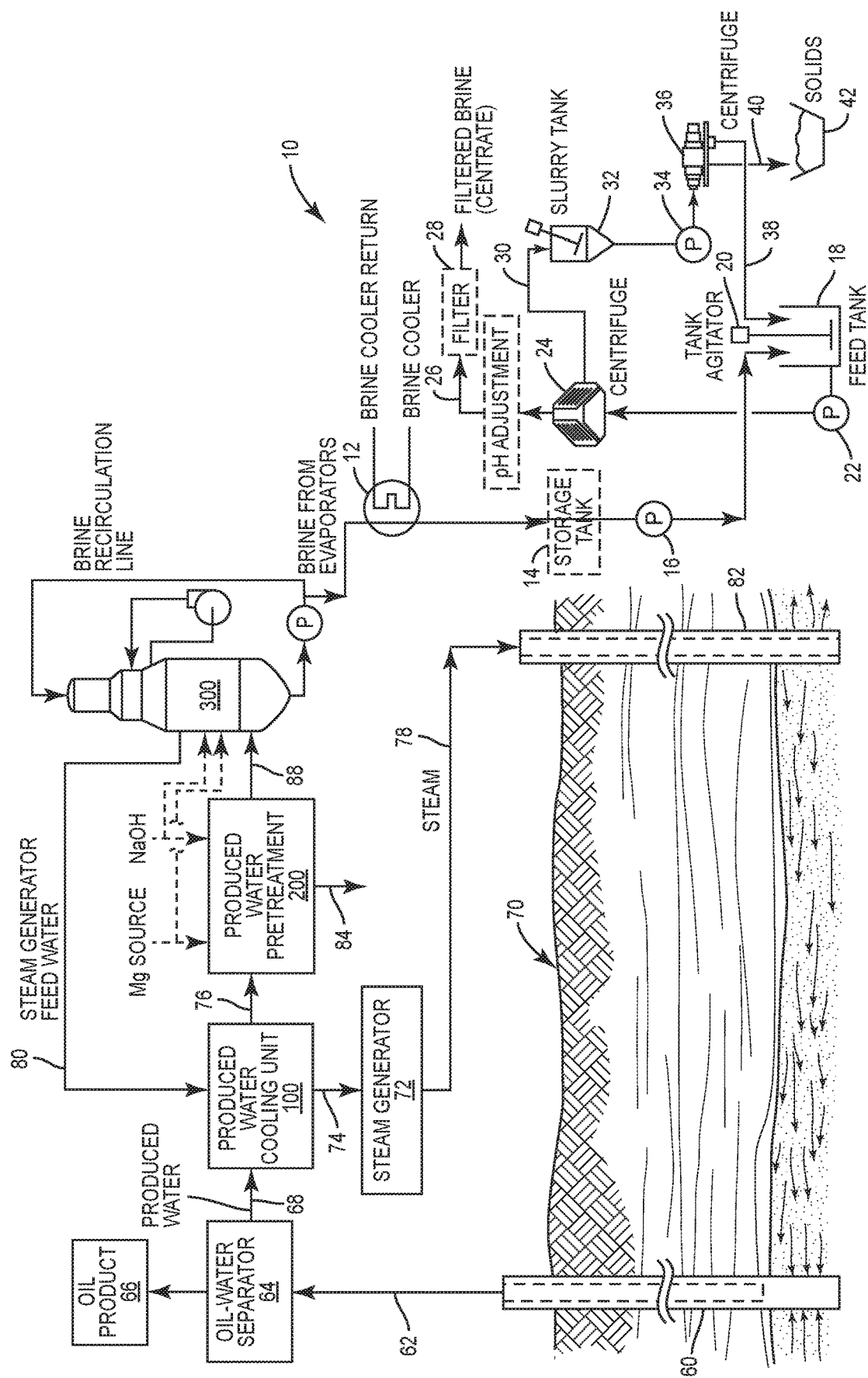
FIG. 3 is a produced water treatment process for treating produced water and removing suspended solids from an evaporator brine produced in the course of treating the produced water.

The processes of FIGS. 1 and 2 can be incorporated into thermal produced water treatment processes. These produced water processes include evaporators that produce evaporator brine that can have unacceptable levels of suspended solids and in some cases silica. These treatment processes vary. FIG. 3 shows a typical produced water treatment process that produces evaporator brine and which includes the basic treatment process shown in FIG. 1.

The produced water treatment process of FIG. 3 will be briefly described. In one embodiment, a steam-assisted gravity drainage (SAGD) oil recovery process includes recovering an oil-water mixture 62 from an oil-bearing formation 70. The SAGD process for oil recovery relies on injecting energy, generally in the form of steam, into an oil-bearing formation 70 to thin and loosen the oil material bound within the formation and mobilize the oil by mixing the oil with hot water from condensing steam. The recovered oil-water mixture 62 is generally quite hot and is directed to a separator 64 where a product oil 66 is extracted from the oil-water mixture, leaving produced water 68. Although not illustrated in FIG. 3, in some cases the oil-water separator 64 is followed by a de-oiling unit for further recovering oil. Due to the relatively high temperature of the produced water 68, it is desirable to cool the produced water to some extent before further treatment. For this purpose, produced water is directed to a cooling unit 100 where the produced water is cooled by transferring heat to a steam generator feedwater 80. This process produces cool produced water 76. The steam generator feedwater 80 is heated to form heated feedwater 74 which in turn is directed into a steam generator 72. Steam generator 72 produces steam that is directed through line 78 into a steam injection well. As shown in FIG. 1, steam is injected into the formation 70 via injection well 82. This mobilizes in the formation as discussed above.

The cool produced water 76 is directed into a produced water pre-treatment unit 200. Various types of pre-treatment can be employed, including suspended solids removal, chemical softening and processes that target certain contaminants such as silica. Note in FIG. 3 where the pre-treatment may entail the precipitation of contaminants, such as hardness, which are directed from the process via line 84. Note in FIG. 3 where as an option a magnesium source and/or a caustic, such as sodium hydroxide, can be added to the produced water during pre-treatment. Adding sodium hydroxide increases the pH of the produced water. Adding a magnesium source results in the formation of magnesium hydroxide and results in the co-precipitation of magnesium hydroxide and silica which is often found in produced water. The particular location where the magnesium source is added can vary. For example, in another embodiment or design, the magnesium source is added to the evaporator 300.

After pre-treatment, the produced water 88 is directed to an evaporator 300. Evaporator 300 in conventional fashion produces steam which is condensed to form the steam generator feedwater. In the course of evaporating the produced water, the evaporate 300 produces a concentrated brine which is recirculated through the evaporator. A portion of the evaporator brine is deemed evaporator blowdown and the evaporator blowdown contains the suspended solids and other precipitants, such as silica, discussed above. Note in the FIG. 3 process that the evaporator blowdown becomes the evaporator brine which is directed to the first centrifuge 24 that separates the suspended solids and other precipitants from the evaporator brine. Details of the process for treating evaporator brine, as depicted in FIG. 3, will not be repeated here since it was described above.

Figure 4:
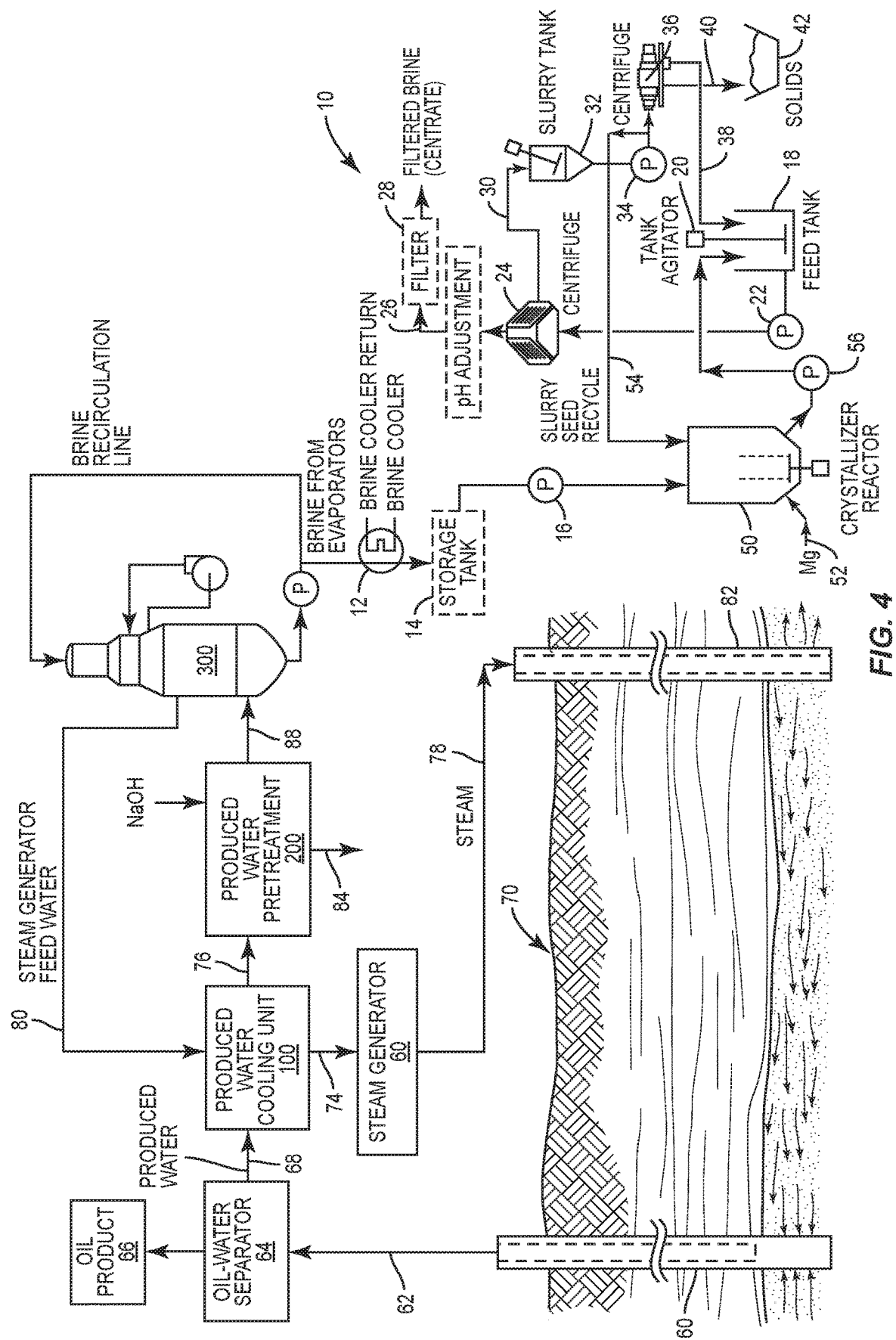
FIG. 4 is a schematic illustration of a produced water process where the evaporator brine includes dissolved silica and the process entails removing the dissolved silica from the concentrated brine prior to the brine being disposed of through deep well injection or other suitable approaches.

FIG. 4 depicts another type of a SAGD process that is similar in many respects to the process of FIG. 3. The FIG. 4 process is generally referred to as a high pH produced water process. This process can be employed where the produced water has a relatively high concentration of soluble silica. Elevating the pH of the produced water increases the solubility of silica and can reduce silica scaling of process equipment, particularly the evaporator 300. As shown in FIG. 4, sodium hydroxide is added to the produced water. This raises the pH of the produced water to generally 10 or higher. As noted above, this increases the solubility of silica in the produced water and can tend to reduce silica scaling in the downstream evaporator 300. In some high pH produced water processes, all or substantially all of the silica remains soluble and ends up in the evaporator brine. This complicates the disposal of the brine. In the case of the FIG. 4 embodiment, the evaporator brine treatment process includes the crystallizer 50 which is fed with a magnesium source, and as discussed above, results in the co-precipitation of magnesium hydroxide and silica which is ultimately removed from the evaporator brine by the first centrifuge 24.

From the foregoing discussion, it is appreciated that the present invention presents an efficient and effective way of treating evaporator brines by removing suspended solids, silica and other precipitants that enable the brines to be injected into deep wells.

What is claimed is:

1. A process of recovering oil and treating evaporator concentrate containing suspended solids produced during the process, the process comprising:
   recovering an oil-water mixture from an oil well;
   separating oil from the oil-water mixture to produce an oil product and produced water;
   directing the produced water to an evaporator and producing a distillate and the evaporator concentrate containing suspended solids;
   treating the evaporator concentrate and removing the suspended solids therefrom by:
   i. directing the evaporator concentrate into a feed tank having a mixer;
   ii. generating a second centrate downstream from the feed tank;
   iii. directing the second centrate into the feed tank and mixing the second centrate with the evaporator concentrate to form a mixture;
   iv. directing the mixture from the feed tank to a disk stack centrifuge and centrifuging the mixture to produce a first centrate essentially free of suspended solids and a slurry containing the suspended solids;
   v. further treating or disposing of the first centrate; and
   vi. after centrifuging the mixture in the disk stack centrifuge, directing the slurry to a solid bowl centrifuge and centrifuging the slurry to produce a wet cake and the second centrate.

2. The process of claim 1 wherein at least some of the suspended solids contained in the evaporator concentrate have a size of 1 micron or less and wherein the disk stack centrifuge is effective to remove the suspended solids from the evaporator concentrate down to 5 microns.

3. The process of claim 1 including directing the slurry from the disk stack centrifuge to a slurry tank operatively connected between the disk stack centrifuge and the solid bowl centrifuge and mixing the slurry in the slurry tank prior to the slurry being directed to the solid bowl centrifuge.

4. The process of claim 1 wherein the evaporator concentrate also includes silica and wherein prior to the mixture being centrifuged in the disk stack centrifuge, the evaporator concentrate is directed into a crystallizer and wherein the process further includes:
   i. mixing a magnesium source with the evaporator concentrate to form magnesium hydroxide;
   ii. co-precipitating the magnesium hydroxide and silica from the evaporator concentrate; and
   iii. directing the evaporator concentrate containing the suspended solids, silica and magnesium hydroxide from the crystallizer to the feed tank.

5. The process of claim 4 including recycling at least a portion of the slurry to the crystallizer and mixing the slurry with the evaporator concentrate.

6. A process of recovering oil and treating evaporator concentrate produced during the process, the process comprising:
   recovering an oil-water mixture from an oil well;
   separating oil from the oil-water mixture to produce an oil product and produced water having suspended solids and dissolved silica therein;
   directing the produced water to an evaporator and producing a distillate and a concentrated brine containing the silica and the suspended solids;
   removing at least some of the suspended solids and silica from the concentrated brine by:
   i. directing the concentrated brine to a crystallizer;
   ii. mixing a magnesium source with the concentrated brine to form magnesium hydroxide;
   iii. co-precipitating the magnesium hydroxide and silica from the concentrated brine;
   iv. after co-precipitating the magnesium hydroxide and silica from the concentrated brine, directing the concentrated brine to a feed tank having a mixer;
   v. generating a second centrate downstream from the feed tank;
   vi. directing the second centrate into the feed tank and mixing the second centrate with the concentrated brine to form a mixture;
   vii. directing the mixture from the feed tank to a disk stack centrifuge and centrifuging the mixture to produce a first centrate essentially free of the suspended solids and the silica and a slurry containing the silica and the suspended solids;
   viii. disposing of or further treating the first centrate from the disk stack centrifuge; and ix. directing the slurry containing the silica and the suspended solids to a second centrifuge downstream of the disk stack centrifuge and centrifuging the slurry to produce the second centrate and solids.

7. The process of claim 6 including recycling a portion of the slurry to the crystallizer.

8. The process of claim 6 wherein at least some of the precipitated silica and suspended solids are in the form of particles having a size of 1 micron or less and wherein the process includes removing the particles down to 5 microns with the disk stack centrifuge.

9. The process of claim 6 further including directing the slurry from the disk stack centrifuge to a slurry tank and mixing the slurry therein prior to directing the slurry to the second centrifuge.

* * * * *